United States Patent
Brainch et al.

(10) Patent No.: US 6,893,217 B2
(45) Date of Patent: May 17, 2005

(54) METHODS AND APPARATUS FOR ASSEMBLING GAS TURBINE NOZZLES

(75) Inventors: Gulcharan S. Brainch, West Chester, OH (US); Dean Lenahan, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 41 days.

(21) Appl. No.: 10/324,849

(22) Filed: Dec. 20, 2002

(65) Prior Publication Data

US 2004/0120814 A1 Jun. 24, 2004

(51) Int. Cl.$^7$ ................................................ F01D 1/02
(52) U.S. Cl. .................... 415/189; 415/209.3
(58) Field of Search .................... 415/191, 209.2, 415/209.3, 209.4, 210.1, 189

(56) References Cited

U.S. PATENT DOCUMENTS

| | | | |
|---|---|---|---|
| 3,842,595 A | * 10/1974 | Smith et al. ................. | 415/191 |
| 4,126,405 A | 11/1978 | Bobo | |
| 4,297,077 A | 10/1981 | Durgin et al. | |
| 4,425,078 A | * 1/1984 | Robbins ................... | 415/209.3 |
| 4,522,054 A | 6/1985 | Wilson et al. | |
| 4,531,289 A | 7/1985 | Brick | |
| 4,732,029 A | 3/1988 | Bertino | |
| 4,842,249 A | 6/1989 | Weigand | |
| 4,869,465 A | 9/1989 | Yirmiyahu et al. | |
| 5,092,735 A | * 3/1992 | Katy et al. ................... | 415/115 |
| 5,243,761 A | 9/1993 | Sullivan et al. | |
| 5,249,920 A | 10/1993 | Shepherd et al. | |
| 5,289,711 A | 3/1994 | Spiegel | |
| 5,343,694 A | * 9/1994 | Toborg et al. ........... | 415/209.2 |
| 5,358,379 A | * 10/1994 | Pepperman et al. ........ | 415/191 |
| 5,372,476 A | 12/1994 | Hemmelgarn et al. | |
| 5,425,260 A | 6/1995 | Gehron | |
| 5,620,300 A | 4/1997 | Knujit | |
| 5,662,160 A | 9/1997 | Correia et al. | |
| 5,669,757 A | 9/1997 | Brackett | |
| 5,673,898 A | 10/1997 | Michalo | |
| 5,732,932 A | 3/1998 | Michalo | |
| 5,810,333 A | 9/1998 | Hickerson et al. | |
| 5,848,854 A | 12/1998 | Brackett | |
| 5,875,554 A | 3/1999 | Vogelsanger | |
| 5,953,822 A | 9/1999 | Vogelsanger | |
| 6,076,835 A | * 6/2000 | Ress et al. ................ | 415/174.2 |
| 6,099,245 A | 8/2000 | Bunker | |
| 6,164,656 A | 12/2000 | Frost | |
| 6,193,465 B1 | 2/2001 | Liotta et al. | |
| 6,227,800 B1 | * 5/2001 | Spring et al. ................ | 415/116 |
| 6,272,900 B1 | 8/2001 | Kobel | |
| 6,311,537 B1 | 11/2001 | Vigil | |

* cited by examiner

*Primary Examiner*—Edward K. Look
*Assistant Examiner*—Richard A Edgar
(74) *Attorney, Agent, or Firm*—William Scott Andes; Armstrong Teasdale LLP

(57) ABSTRACT

A method enables a turbine nozzle for a gas turbine engine to be assembled. The method includes providing a turbine nozzle including a plurality of airfoil vanes extending between an inner band and an outer band, wherein the outer band includes at least one mounting system that extends radially outwardly therefrom and includes a rail and at least one hook, and coupling the turbine nozzle into the gas turbine engine using the mounting system such that the turbine nozzle is at least partially supported by at least one hook. The method also includes positioning a seal assembly between at least one hook and the outer band to facilitate reducing radial leakage through the turbine nozzle.

20 Claims, 4 Drawing Sheets

METHODS AND APPARATUS FOR ASSEMBLING GAS TURBINE NOZZLES

BACKGROUND OF THE INVENTION

This invention relates generally to gas turbine engine nozzles and more particularly, to methods and apparatus for assembling gas turbine engine nozzles.

Gas turbine engines include combustors which ignite fuel-air mixtures which are then channeled through a turbine nozzle assembly towards a turbine. At least some known turbine nozzle assemblies include a plurality of nozzles arranged circumferentially and configured as doublets. At least some known turbine nozzles include more than two circumferentially-spaced hollow airfoil vanes coupled by integrally-formed inner and outer band platforms. Specifically, the inner band forms a radially inner flowpath boundary and the outer band forms a radially outer flowpath boundary. Additionally, at least some known outer bands include a forward and an aft hook assembly that are used to couple the turbine nozzle within the engine.

Forming the turbine nozzle with a plurality of integrally-formed airfoil vanes facilitates improving durability and reducing leakage in comparison to turbine nozzles which include only one airfoil vane. However, when cooling air is channeled to the turbine nozzle, leakage may still occur between circumferentially-adjacent turbine nozzles, which are spaced apart by a gap or interface that facilitates engine assembly, and accommodates thermal expansion between the turbine nozzles. Accordingly, at least some known turbine nozzles include a seal assembly that is positioned radially outwardly from the aft hook assembly to facilitate minimizing leakage through the interface. Over time, thermal cycling may cause degradation of the seals. However, accessing such interface seals may be difficult due to the location of the nozzle.

BRIEF SUMMARY OF THE INVENTION

In one aspect, a method for assembling a turbine nozzle for a gas turbine engine is provided. The method comprises providing a turbine nozzle including a plurality of airfoil vanes extending between an inner band and an outer band, wherein the outer band includes at least one mounting system that extends radially outwardly therefrom and includes a rail and at least one hook, and coupling the turbine nozzle into the gas turbine engine using the mounting system such that the turbine nozzle is at least partially supported by the at least one hook. The method also comprises positioning a seal assembly between at least one hook and the outer band to facilitate reducing radial leakage through the turbine nozzle.

In another aspect of the invention, a turbine nozzle for a gas turbine engine is provided. The nozzle includes an outer band, an inner band, at least one airfoil vane that extends between the inner and outer bands, and a seal assembly. The outer band includes an inside face, an outside face, and an aft hook assembly that extends outwardly from the outside face. The aft hook assembly includes a rail and at least one hook extending outwardly from the rail. The seal assembly is positioned adjacent the outer band hook assembly and is radially inward from at least one hook.

In a further aspect, a gas turbine engine is provided. The engine includes at least one turbine nozzle assembly comprising a seal assembly, an outer band, an inner band, and a plurality of airfoil vanes coupled together by the outer and inner bands. The outer band includes a hook assembly that extends radially outwardly from the outer band, and includes a rail and at least one hook extending outwardly from the rail. The seal assembly is positioned radially inwardly from the at least one hook.

DETAILED DESCRIPTION OF THE INVENTION

Figure 1:
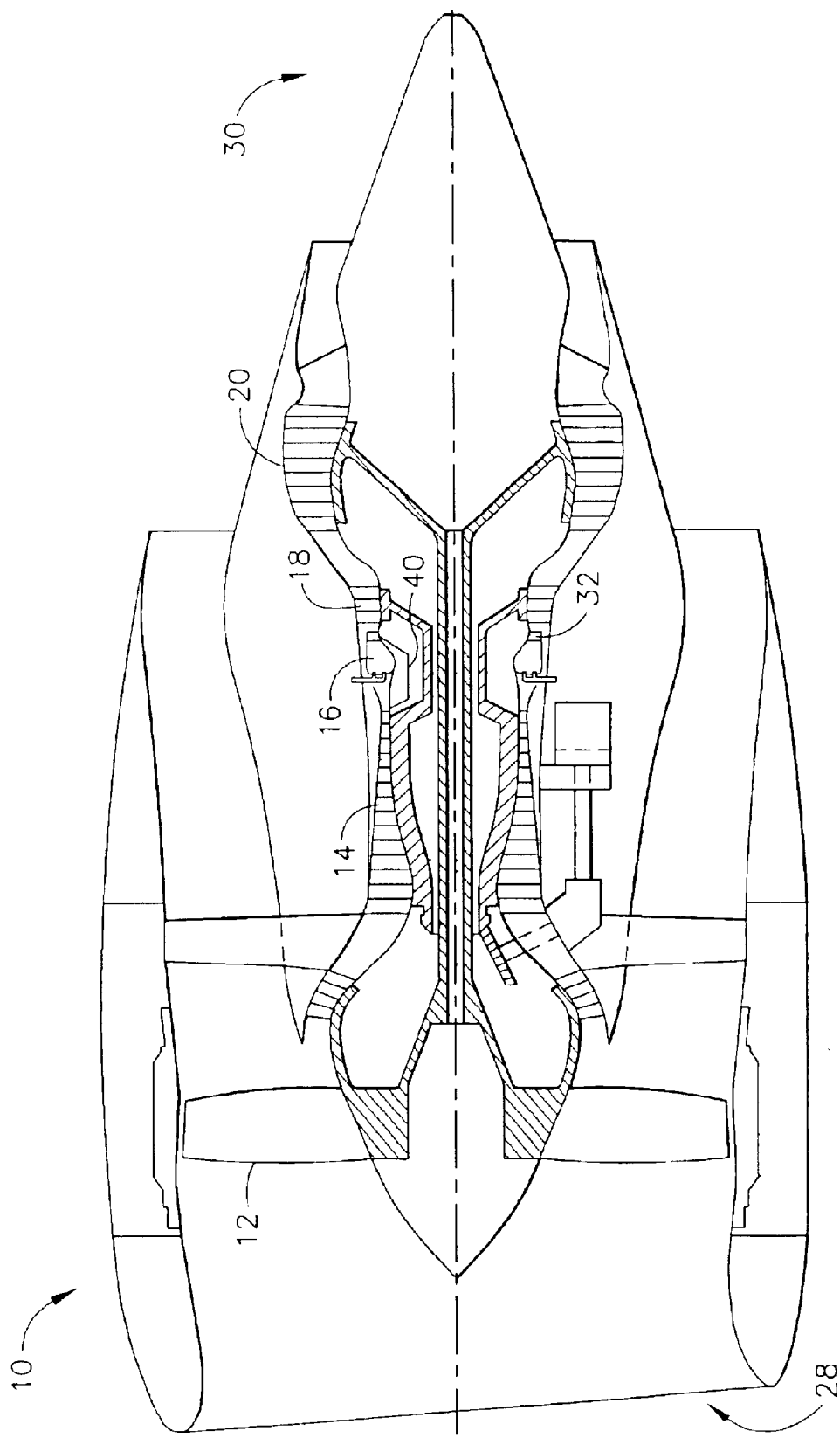
FIG. 1 is a schematic illustration of a gas turbine engine.

FIG. 1 is a schematic illustration of a gas turbine engine 10 including, in serial flow arrangement, a fan assembly 12, a high-pressure compressor 14, and a combustor 16. Engine 10 also includes a high-pressure turbine 18 and a low-pressure turbine 20. Engine 10 has an intake side 28 and an exhaust side 30. In one embodiment, engine 10 is a CF-34 engine commercially available from General Electric Aircraft Engines, Cincinnati, Ohio.

In operation, air flows through fan assembly 12 and compressed air is supplied to high-pressure compressor 14. The highly compressed air is delivered to combustor 16 through a turbine nozzle assembly 32. Airflow from combustor 16 drives turbines 18 and 20, and turbine 20 drives fan assembly 12. Turbine 18 drives high-pressure compressor 14.

Figure 2:
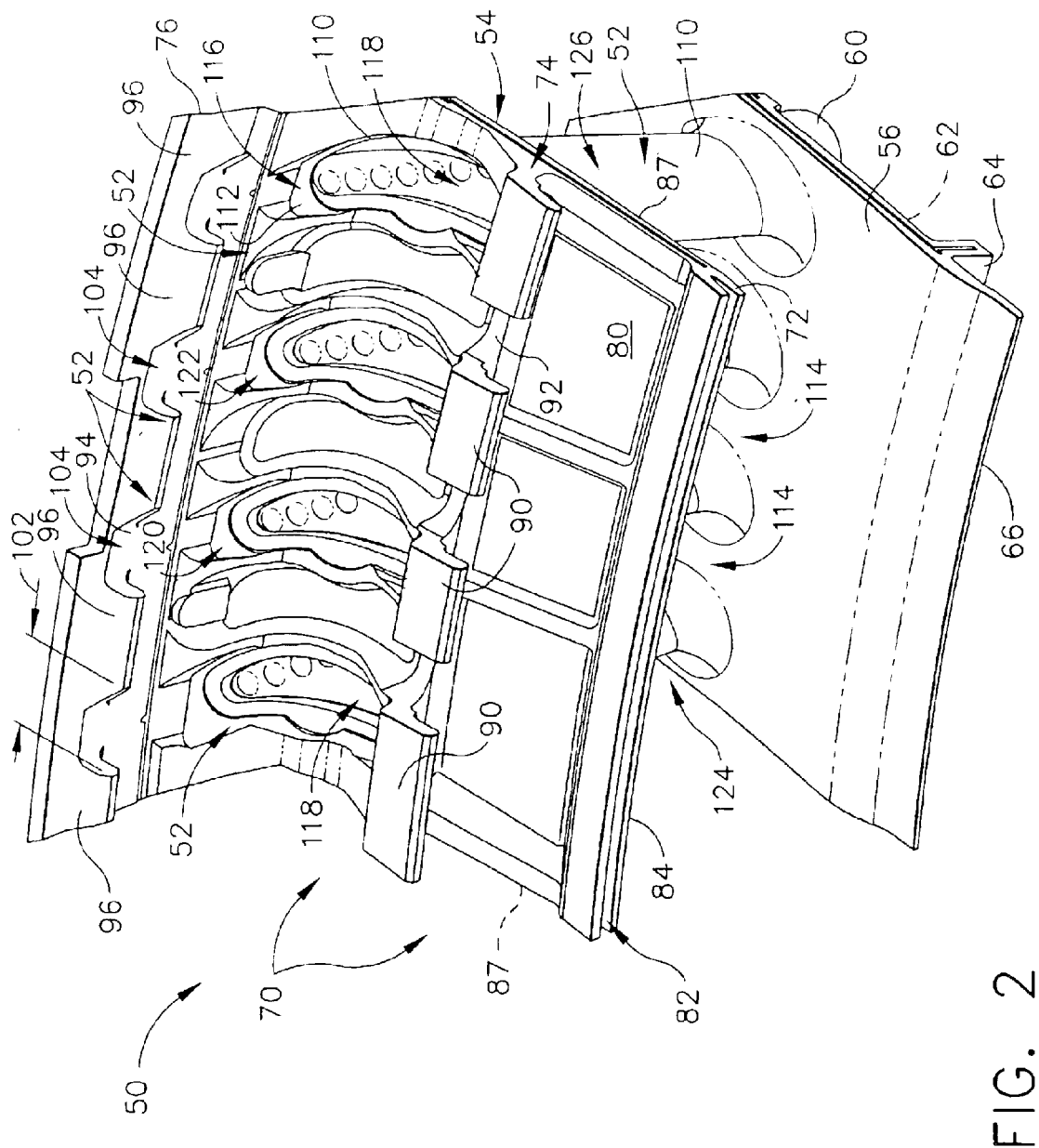
FIG. 2 is a perspective view of a turbine nozzle that may be used with the gas turbine engine shown in FIG. 1.
Figure 3:
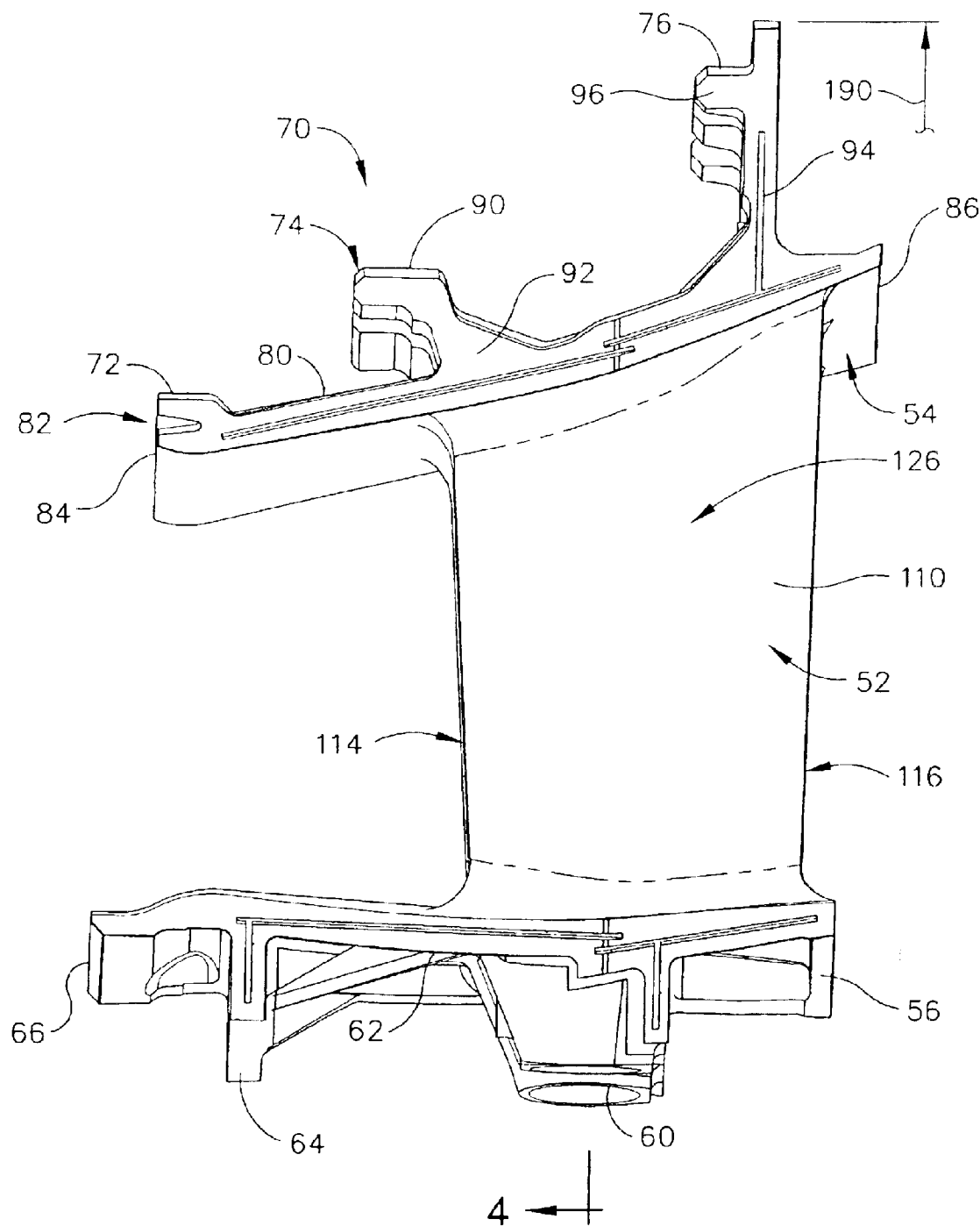
FIG. 3 is a side perspective view of the turbine nozzle shown in FIG. 2.
Figure 4:
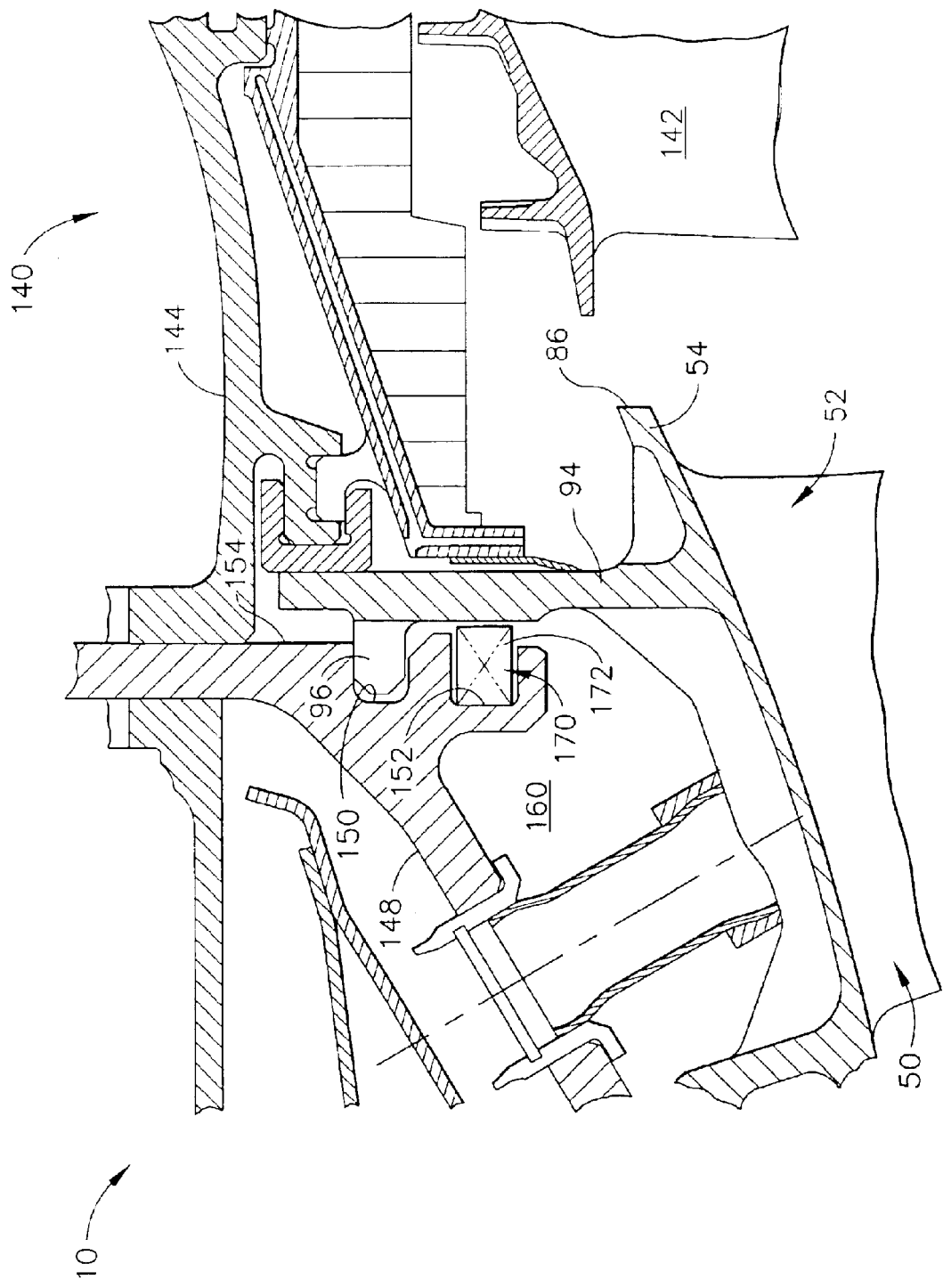
FIG. 4 is a partial cross-sectional view of the engine shown in FIG. 1 including a partial view of the turbine nozzle shown in FIGS. 2 and 3.

FIG. 2 is a perspective view of a turbine nozzle sector 50 that may be used with gas turbine engine 10 (shown in FIG. 1). FIG. 3 is a side perspective view of turbine nozzle sector 50. FIG. 4 is a partial cross-sectional view of engine 10 including a partial view of turbine nozzle sector 50. Nozzle 50 includes a plurality of circumferentially-spaced airfoil vanes 52 coupled together by an arcuate radially outer band or platform 54 and an arcuate radially inner band or platform 56. More specifically, in the exemplary embodiment, each band 54 and 56 is integrally-formed with airfoil vanes 52, and nozzle sector 50 includes four airfoil vanes 52. In one embodiment, each arcuate nozzle sector 50 is known as a four vane segment.

Inner band 56 includes an aft flange 60 that extends radially inwardly therefrom. More specifically, flange 60 extends radially inwardly from band 56 with respect to a radially inner surface 62 of band 56. Inner band 56 also includes a forward flange 64 that extends radially inwardly therefrom. Forward flange 64 is positioned between an upstream edge 66 of inner band 56 and aft flange 60, and extends radially inwardly from band 56.

Outer band 54 includes a cantilever mounting system 70 that includes a forward retainer 72, a mid hook assembly 74, and an aft hook assembly 76. Cantilever mounting system 70 facilitates supporting turbine nozzle 50 within engine 10 from a surrounding annular engine casing (not shown). Forward retainer 72 extends radially outwardly from an outer surface 80 of outer band 54 and defines a channel 82 that extends continuously in a circumferential direction across a leading edge 84 of outer band 54. Outer band 54 also includes a trailing edge 86 that is coupled to leading edge 84 by a pair of oppositely-disposed sector ends 87.

Mid hook assembly 74 is positioned aft of forward retainer 72 and in the exemplary embodiment, includes a plurality of circumferentially-spaced and circumferentially-aligned hooks 90 that each extend upstream from a forward rail 92. Forward rail 92 extends radially outwardly from outer band outer surface 80. Hook assembly 74 extends in a circumferential direction across outer band outer surface 80 between circumferential ends 87.

Aft hook assembly 76 is positioned aft of mid hook assembly 74, and as such is between nozzle trailing edge 86 and mid hook assembly 74. Hook assembly 76 includes an aft rail 94 and a plurality of hooks 96. Rail 94 extends radially outwardly from outer band outer surface 80 in a circumferential direction across outer band outer surface 80 and between circumferential ends 87.

Hooks 96 do not extend continuously between circumferential ends 87, but rather hooks 96 are scalloped such that adjacent hooks 96 are spaced a distance 102 apart. Accordingly, a scalloped recessed area 104 is defined between each set of adjacent hooks 96. Specifically, each recessed area 104 is radially aligned and radially outwardly from a respective airfoil vane 52. As such, each hook 96 is radially aligned between adjacent vanes 52. Accordingly, in the exemplary embodiment, nozzle 50 includes four scalloped recessed areas 104.

Airfoil vanes 52 are substantially similar and each includes a first sidewall 110 and a second sidewall 112. First sidewall 110 is convex and defines a suction side of each airfoil 52, and second sidewall 112 is concave and defines a pressure side of each airfoil vane 52. Sidewalls 110 and 112 are joined at a leading edge 114 and at an axially-spaced trailing edge 116 of each airfoil vane 52, such that a cavity 118 is defined therebetween. Scalloped recessed areas 104 facilitate access to cavities defined within vanes 52. In one embodiment, inserts (not shown) are inserted within each cavity 118, and recessed areas 104 facilitate their installation and removal. More specifically, each airfoil trailing edge 116 is spaced chordwise and downstream from each respective airfoil leading edge 114. First and second sidewalls 110 and 112, respectively, also extend longitudinally, or radially outwardly, in span from radially inner band 56 to radially outer band 54.

In the exemplary embodiment, each arcuate nozzle portion 50 includes a pair of circumferentially inner airfoil vanes 120 and 122, and a pair of circumferentially outer airfoil vanes 124 and 126. Vanes 120, 122, 124, and 126 are also oriented substantially parallel to each other. Separation distance 102 and an orientation of vanes 52 are each variably selected to facilitate creating a highly divergent flowpath through nozzle 50, and to facilitate optimizing aerodynamic accelerating flow through nozzle sector 50.

Engine 10 includes a rotor assembly 140, such as low pressure turbine 20, that includes at least one row of rotor blades 142 that is downstream from turbine nozzles 50. Rotor assembly 140 is surrounded by a rotor shroud 144 that extends circumferentially around rotor assembly 140 and turbine nozzles 50. Cantilever mounting system 70 couples each turbine nozzle 50 to rotor shroud 144 through a hanger 148 that is supported by and coupled to shroud 144. More specifically, each hook 96 is slidably coupled within a radially outer channel 150 defined within hanger 148.

Hanger 148 also includes a radially inner channel 152 defined therein. Radially inner channel 152 is radially inward from radially outer channel 150 and each channel 150 and 152 is defined inwardly from a downstream side 154 of hanger 148. Accordingly, each channel 150 and 152 is adjacent aft hook assembly 76. Furthermore, when aft hook assembly 76 is coupled to hanger 148, a cavity 160 is defined between hanger 148, aft hook assembly 76, and outer band 54.

A seal assembly 170 is positioned radially inwardly from hooks 96 and extends within hanger radially inner channel 152. More specifically, seal assembly 170 includes a seal member 172 that extends in sealing contact between hanger 148 and aft hook assembly rail 94. In one embodiment, seal member 172 extends substantially circumferentially through engine 10 to facilitate minimizing radial leakage past aft hook assembly 76, as described in more detail below. In an alternative embodiment, seal members 170 are segmented spline seals. In the exemplary embodiment, seal member 172 is a w-seal.

During operation, as hot combustion gases flow through nozzle 50, cooling air is extracted from a high pressure source, such as compressor 14, and directed at a high pressure into cavity 160. More specifically, high pressure cooling air circulates through cavity 160 and facilitates cooling outer band 54 and turbine nozzle vanes 52. Combustion gases flowing through turbine nozzle 50 create an area of low pressure conducive for leakage of high pressure cooling air between hanger 148 and aft hook assembly 76. However, the relative high pressure of the cooling air causes seal member 172 to expand to facilitate preventing leakage between hanger 148 and aft hook assembly 76. Moreover, because seal member 172 is radially inward from hooks 96 and is thus closer to the flow path, seal assembly 170 facilitates enhanced sealing in comparison to other known turbine nozzles. The combination of the enhanced sealing and the position of seal member 170 with respect to the flow path, enables aft hook assembly rail 94 to be fabricated with a radial height 190 that is shorter than other known aft rails. In addition, because aft hook assembly 76 is also scalloped, an overall weight of turbine nozzle 50 is reduced in comparison to other known turbine nozzles that do not include recessed areas 104. As a result, mechanical stresses and thermal stresses induced within nozzle 50 are facilitated to be reduced.

The above-described turbine nozzle includes a scalloped aft hook assembly that extends from the aft rail. The hook assembly includes a plurality of recessed areas that are circumferentially spaced across the outer band. The recessed areas not only reduce an overall weight of the turbine nozzle assembly, but also facilitate reducing thermal stresses induced to the turbine nozzle. In addition, the turbine nozzle includes a seal assembly that is positioned radially inwardly from the aft hook assembly. Accordingly, the seal assembly is closer to the flowpath than other known seal assemblies, which facilitates enhanced sealing in comparison to other known seal assemblies, and also permits weight and stress reduction measures, including scalloping and/or removing portions of the radial flange above the sealing surface. As a result, the durability and useful life of the turbine nozzle are facilitated to be increased by the combination of the scalloped hook assembly and the seal assembly.

Exemplary embodiments of turbine nozzles are described above in detail. The nozzles are not limited to the specific embodiments described herein, but rather, components of each turbine nozzle may be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a turbine nozzle for a gas turbine engine, said method comprising:

providing a turbine nozzle including a plurality of airfoil vanes extending between an inner band and an outer band, wherein the outer band includes at least one mounting system that extends radially outwardly therefrom and includes a rail and at least one hook;

providing a hanger that includes a radially inner channel and a radially outer channel that is positioned a distance from the radially inner channel;

coupling the turbine nozzle to the hanger such that the hook is slidably engaged into the radially outer channel; and positioning a seal assembly at least partially within the radially inner channel such that the seal assembly is between the hanger and the rail to facilitate reducing radial leakage through the turbine nozzle.

2. A method in accordance with claim 1 wherein said providing a turbine nozzle further comprises providing a turbine nozzle including an arcuate outer band that includes a leading edge side, a trailing edge side, and a pair of oppositely-disposed outer sides that extend between the trailing and leading edge sides, and wherein the rail extends between the pair of outer sides.

3. A method in accordance with claim 2 wherein said providing a turbine nozzle further comprises providing a turbine nozzle including the at least one hook that defines at least one scalloped recessed area between the nozzle outer sides.

4. A method in accordance with claim 3 wherein said providing a turbine nozzle including the at least one hook further comprises providing a turbine nozzle including the at least one hook that defines a plurality of scalloped recessed areas, said plurality of recessed areas that facilitate reducing thermal stresses induced to the turbine nozzle.

5. A method in accordance with claim 2 wherein said positioning a seal assembly between the at least one hook and the outer band comprises positioning a w-seal between said at least one hook and the outer band.

6. A turbine nozzle assembly for a gas turbine engine, said nozzle assembly comprising:

a hanger comprising a radially inner channel and a radially outer channel that is positioned a distance from said radially inner channel; and a nozzle comprising an outer band comprising an inside face, an outside face, and an aft hook assembly extending outwardly from said outside face, said aft hook assembly comprising a rail and at least one hook extending outwardly from said rail, said hook slidably engaged into said hanger radially outer channel;

an inner band;

at least one airfoil vane extending between said outer band and said inner band; and a seal assembly positioned at least partially within said hanger radially inner channel such that said seal assembly is between said hanger and said rail.

7. A turbine nozzle assembly in accordance with claim 6 wherein said seal assembly is between said outer band outside face and said aft hook assembly at least one hook.

8. A turbine nozzle assembly in accordance with claim 6 wherein said seal assembly comprises a w-seal.

9. A turbine nozzle assembly in accordance with claim 6 wherein said outer band is arcuate and further comprises an upstream side, a downstream side, and a pair of circumferential outer sides extending between said upstream and downstream sides, said aft hook assembly rail extending across said outer band outer face between said circumferential outer sides, said at least one hook comprising at least one scalloped recessed area.

10. A turbine nozzle assembly in accordance with claim 9 wherein said at least one scalloped recessed area is substantially radially aligned with a downstream side of a hanger.

11. A turbine nozzle assembly in accordance with claim 9 wherein said at least one scalloped recessed area facilitates reducing thermal stresses induced to said turbine nozzle.

12. A turbine nozzle assembly in accordance with claim 9 wherein said at least one scalloped recessed area facilitates radial access to said turbine nozzle airfoil vane.

13. A turbine nozzle assembly in accordance with claim 9 wherein said seal assembly is configured to reduce radial fluid leakage past said turbine nozzle.

14. A gas turbine engine comprising at least one turbine nozzle assembly comprising a seal assembly, an outer band, an inner band, a plurality of airfoil vanes coupled together by said outer and inner bands, said outer band comprising a hook assembly extending radially outwardly from said outer band, said hook assembly comprising a rail and at least one hook extending outwardly from said rail, and a hanger that comprises a radially inner channel and a radially outer channel positioned a distance from said radially outer channel, said hook is slidably engaged into said radially inner channel, said seal is positioned at least partially within said inner channel such that said seal is between said hanger and said rail.

15. A gas turbine engine in accordance with claim 14 wherein said seal assembly is positioned upstream from and adjacent said hook assembly rail.

16. A gas turbine engine in accordance with claim 15 wherein said seal assembly comprises a w-seal.

17. A gas turbine engine in accordance with claim 15 wherein said outer band is arcuate and further comprises a pair of circumferential outer side edges that are substantially axially aligned with respect to said gas turbine engine, said hook assembly rail extending continuously between said circumferential outer side edges, said at least one hook scalloped and defining at least one recessed area between said circumferential outer side edges.

18. A gas turbine engine in accordance with claim 17 wherein said at least one recessed area is substantially radially aligned with respect to at least one of said plurality of airfoil vanes.

19. A gas turbine engine in accordance with claim 15 wherein said outer band is arcuate and further comprises a pair of circumferential outer side edges that are substantially axially aligned with respect to said gas turbine engine, said hook assembly rail extending continuously between said circumferential outer side edges, said at least one hook scalloped and defines a plurality of recessed areas between said circumferential outer side edges.

20. A gas turbine engine in accordance with claim 19 wherein each said plurality of recessed areas is substantially radially aligned with respect to a respective one of said plurality of airfoil vanes.

* * * * *

UNITED STATES PATENT AND TRADEMARK OFFICE
CERTIFICATE OF CORRECTION

PATENT NO. : 6,893,217 B2
DATED : May 17, 2005
INVENTOR(S) : Brainch et al.

It is certified that error appears in the above-identified patent and that said Letters Patent is hereby corrected as shown below:

Column 6,
Line 27, delete "distance from said radially outer" and insert therefor -- distance from said radially inner --.
Line 29, delete "inner channel" and insert therefor -- outer channel --.
Line 30, delete "said inner channel" and insert therefor -- said radially inner channel --.

Signed and Sealed this

Twenty-third Day of August, 2005

JON W. DUDAS
*Director of the United States Patent and Trademark Office*